(12) United States Patent
Ashida et al.

(10) Patent No.: US 6,598,108 B1
(45) Date of Patent: Jul. 22, 2003

(54) INTEGRATED CONTROLLER, INTEGRATED CONTROL SYSTEM AND TRANSMISSION CONTROLLER

(75) Inventors: Kazuhide Ashida, Kanagawa-ken (JP); Yoichi Takayanagi, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 551 days.

(21) Appl. No.: 09/612,320

(22) Filed: Jul. 7, 2000

(30) Foreign Application Priority Data

Jul. 9, 1999 (JP) .......................... 11-196457

(51) Int. Cl.[7] .................. G06F 13/00; G06F 9/00
(52) U.S. Cl. .................. 710/305; 710/100; 711/147
(58) Field of Search .................. 710/1, 100, 305; 711/147, 148; 700/20, 90; 709/1, 202, 253; 712/16; 713/100; 361/683, 684

(56) References Cited

U.S. PATENT DOCUMENTS

| | | | |
|---|---|---|---|
| 5,485,620 A | * | 1/1996 | Sadre et al. |
| 5,889,721 A | * | 3/1999 | Gannage |
| 6,141,762 A | * | 10/2000 | Nicol et al. |
| 6,195,591 B1 | * | 2/2001 | Nixon et al. |

* cited by examiner

Primary Examiner—Gopal C. Ray
(74) Attorney, Agent, or Firm—Finnegan, Henderson, Farabow, Garrett & Dunner, L.L.P.

(57) ABSTRACT

An integrated controller, including a plurality of controllers, each of the controllers executing a different program, and an integrator configured to imaginarily integrate the controllers as a single controller.

17 Claims, 10 Drawing Sheets

INTEGRATED CONTROLLER, INTEGRATED CONTROL SYSTEM AND TRANSMISSION CONTROLLER

CROSS REFERENCE TO RELATED APPLICATION

This application claims benefit of priority to Japanese Patent Application No. 11-196457 filed Jul. 9, 1999, the entire content of which is incorporated by reference herein.

BACKGROUND OF THE INVENTION

1. Field of the Invention

This invention relates to an integrated controller, an integrated control system and a transmission controller, used for a steel manufacturing plant, a paper mill plant, a public utility system such as a water and sewage system, a manufacturing process of automobile industry and a petrochemical plant.

2. Description of the Background

Currently, three conventional control methods, which are a loop control, a sequence control and a computer control, are used in plants and manufacturing processes for various industrial fields.

The loop control, for example, is used for plants which need a repetitive control to keep a temperature of a certain portion at a predetermined value. A PID control and a feed back control are its representative samples. Since the loop control is a kind of control method used for a temperature control, it is said that a control cycle is, for example, from several hundred milliseconds to several seconds. The loop control is usually used for a petrochemical plant.

The sequence control, for example, is used in a situation that respective first, second and third manufacturing steps of an assembly line are managed sequencially. Accordingly, the sequence control is used in a case that only one output is needed for an appointed input, that is, in case of adopting a combination logic. The sequence control possesses a time factor, so-called sequence, in its control objectives. Since the sequence control is mainly used to control machinery, a control cycle is set to a relatively high speed, for example, from several milliseconds to several hundred milliseconds. The sequence control is widely used for systems for industries such as a paper mill plant, a public utility system such as a water and sewage system, and an assembly line of automobile industry.

The computer control is used in a condition that collected data and information are processed and analyzed. The computer control realizes a control based on an event as the event arises. As described above, a controlling target and a control cycle are generally different among a loop controller for the loop control, a programmable controller for the sequence control and a personal computer that runs software corresponding to OS to realize the computer control. Further, because a nature of a program is also different each other, programming languages expressing the program are different respectively. Accordingly, different platforms (hardware) and different programming languages are used for the respective controllers.

As described above, the loop control, the sequence control and the computer control are usually used as control methods. A control method suitable for each of control targets is selected and used so far. For example, the loop control is used for a temperature control of a food processing plant. The sequence control is used in a packaging stage for the processed foods.

On the other hand, users sometimes request to unify from the food processing stage to the packaging stage for the processed foods and to process the stages. That is, users want to manage the food processing stage and the packaging stage uniformly by being designed to unify a program of the loop control and a program of the sequence control.

However, a control cycle, a nature of a platform to be used and a programming language are different between the loop control and the sequence control. The same thing may occur in a case that a certain control other than the loop control and the sequence control is tried to be combined and unified.

Accordingly, since it requires a great deal of work to unify different controllers that realize respective different control, an approach to unify the different controllers is not thought positively so far.

Up to now, it requires a special apparatus such as a tag server that realizes a synchronous processing for data conversion, data communication and a control cycle in order to coordinate with the respective different controllers, thereby making a structure complicated and increasing a maintenance cost.

Further, it requires a large amount of initial cost to adopt such special apparatus in order to realize coordination among the different controllers, because it is needed to register various setting procedures concerning data conversion and data communication. Accordingly, it is difficult to install a new different controller and to change a program.

SUMMARY OF THE INVENTION

Accordingly, one object of this invention is to provide an integrated controller, an integrated control system and a transmission controller which may imaginarily integrate different controllers into a single controller by not simply coordinating with the different controllers.

Another object of this invention is to provide an integrated controller, an integrated control system and a transmission controller which may easily and positively integrate different controllers, reducing a special apparatus and work needed for integrating the different controllers.

The present invention provides an integrated controller, including a plurality of controllers, each of the controllers executing a different program, and an integrator configured to imaginarily integrate the controllers as a single controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Several embodiments of the present invention are hereinafter described in detail referring drawings.

First Embodiment

In a first embodiment, an integrated controller that integrates a plurality of controllers is explained.

Figure 1:
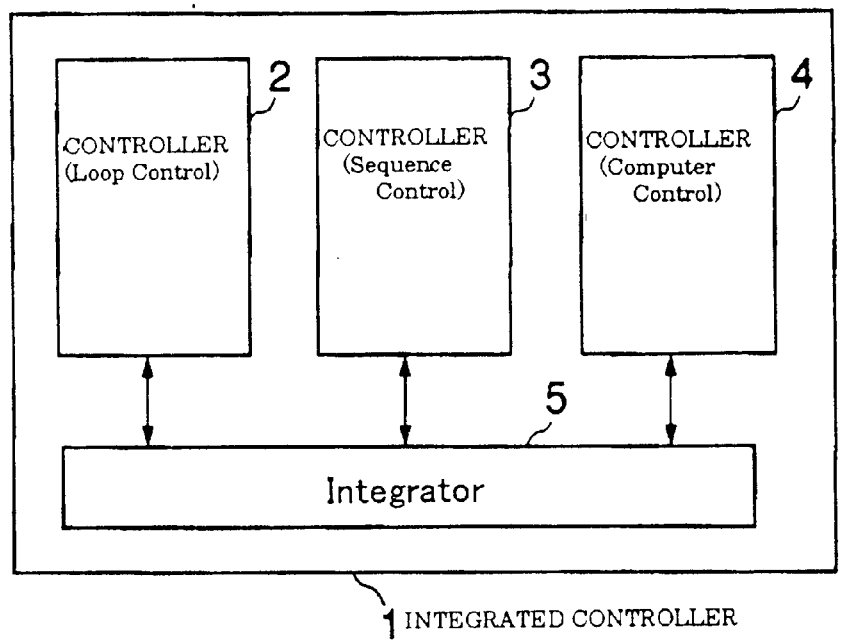
FIG. 1 is a block diagram showing constituents of an integrated controller of a first embodiment.

FIG. 1 is a block diagram showing constituents of the integrated controller of the first embodiment.

The integrated controller (station) 1 includes a loop controller 2 for executing a loop control, a sequence controller 3 for executing a sequence control, a computer controller 4 for executing a computer control and an integrator 5 for integrating every controller 2~4.

The integrator 5 is a component that enables to imaginarily function all controllers 2~4 as a single controller. For example, the integrator 5 that includes a common memory and a common bus is hereinafter described.

Figure 2:
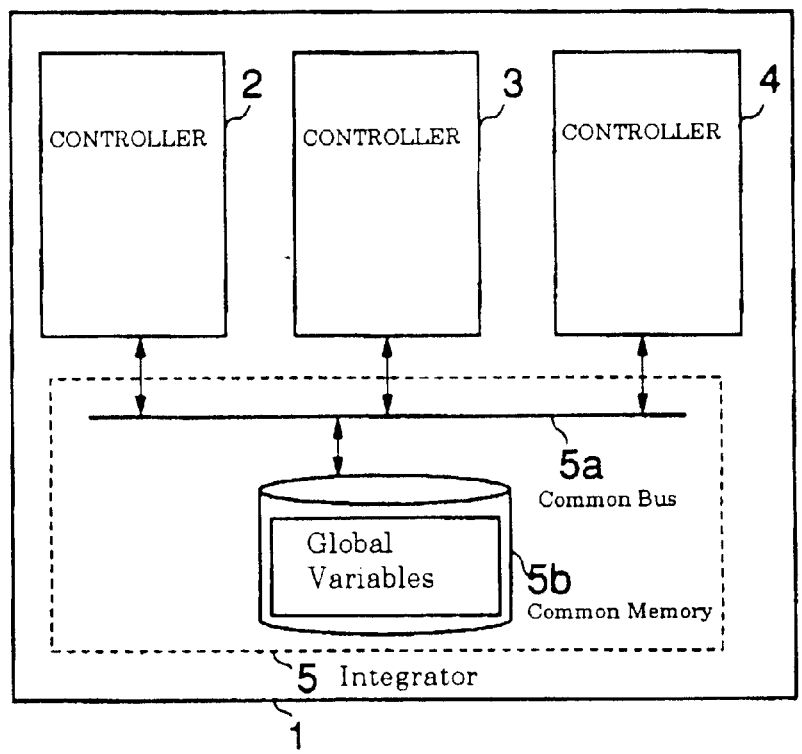
FIG. 2 is a block diagram showing an integrator, which includes a common memory and a common bus, of the integrated controller of the first embodiment.

FIG. 2 is a block diagram showing the integrator 5, which includes a common memory 5b and a common bus 5a, of the integrated controller 1 of the first embodiment.

Each of controllers 2~4 executes a program by using global variables accessed and shared with different controllers from each other.

The common bus 5a is connected to each of the controllers 2~4 and the common memory 5b and enables all controllers 2~4 to access the common memory 5b.

The common memory 5b is a memory device that the controllers 2~4 may access in common through the common bus 5a. The common memory 5b stores the global variables.

In the integrated controller 1 described above, the global variables accessed and shared by each of the controllers 2~4 are stored in the common memory 5b.

Each of the controllers 2~4 may access to the common memory 5b. Accordingly, the global variables stored in the common memory 5b can be accessed by different controllers from each other in the same way as each of the controllers 2~4 access to local variables stored in its own memory.

According to the integrated controller 1, data communication among the controllers 2~4 maybe easily executed by using the global variables.

Therefore, an execution of a program operated in a different controller may be regarded as a similar execution of a program operated in its own controller, there by enabling the integrated controller composed of the different controllers 2~4 to be treated as if it is a single controller.

For example, once any one of the controllers 2~4 writes the global variables to the common memory 5b, stored data may be exchanged without data transfer process among the controllers 2~4 by the other controllers 2~4 reading the global variables from the common memory 5b. When the respective different controllers 2~4 exchange the global variables in the above manner, transformation of a data format and a data communication are unnecessary.

Further, anyone of the controllers 2~4 writes the global variables to the common memory 5b, and the other controllers 2~4 watch the global variables stored in the common memory 5b. When a value of the global variables reaches within a predetermined limits, a predetermined control starts to be executed, thereby adjusting a control timing among the controllers 2~4.

According to the above integrator 5 that includes the common bus 5a and the common memory 5b, since exchange of data and synchronous operation of control among the controllers 2~4 are executed properly, an integrated part composed of the different controllers 2~4 may be treated as if it is a single controller.

As described above, the integrated controller 1 of the first embodiment integrates the controllers 2~4 as a single controller imaginarily by storing the global variables shared with the controllers 2~4 to the common memory 5b accessed by the controllers 2~4 in common.

Therefore, a suitable control may be realized in a good condition. For example, in a certain series of control, a control suitable for a loop controller is executed by the loop controller 2 and a control suitable a sequence controller is executed by the sequence controller 3. Accordingly, users may design a content of control process in a mass, and then divide and assign the designed content of control process to the respective suitable controllers, whereby users may manage the content of control process together.

Further, since the integrated controller 1 may integrate the controllers 2~4 without special apparatus and data setting procedure, it becomes easier to install new controllers and to change a content of control process of the controllers 2~4, and work is simplified.

Especially, in the first embodiment, since it is possible to share data and to suit a control cycle in a similar way of simply accessing a memory, it is unnecessary to transmit and convert data among the controllers 2~4 and a control processing may be simplified.

In the first embodiment, it is described that the integrator 5 includes the common bus 5a and the common memory 5b, and the respective controllers 2~4 are integrated by accessing the global variables stored in the common memory 5b through the common bus 5a. However, integrating methods of controllers are not limited to the above embodiment. For example, global variables may be communicated to each other by only connecting every controller 2~4 to the common bus 5a, or by every controller 2~4 directly accessing the common memory 5b without using the common bus 5a.

Furthermore, in the first embodiment, the integrated controller 1 including one each of three kinds of controllers for controlling a loop control, a sequence control and a computer control is described as an example, but integrated controllers are not limited to the above integrated controller 5. For example, the number of controllers is not limited. So, any number of controllers may be deleted and added freely. Kinds of controllers are also not limited.

Second Embodiment

In a second embodiment, a modified integrated controller of the integrated controller of the first embodiment is described.

Figure 3:
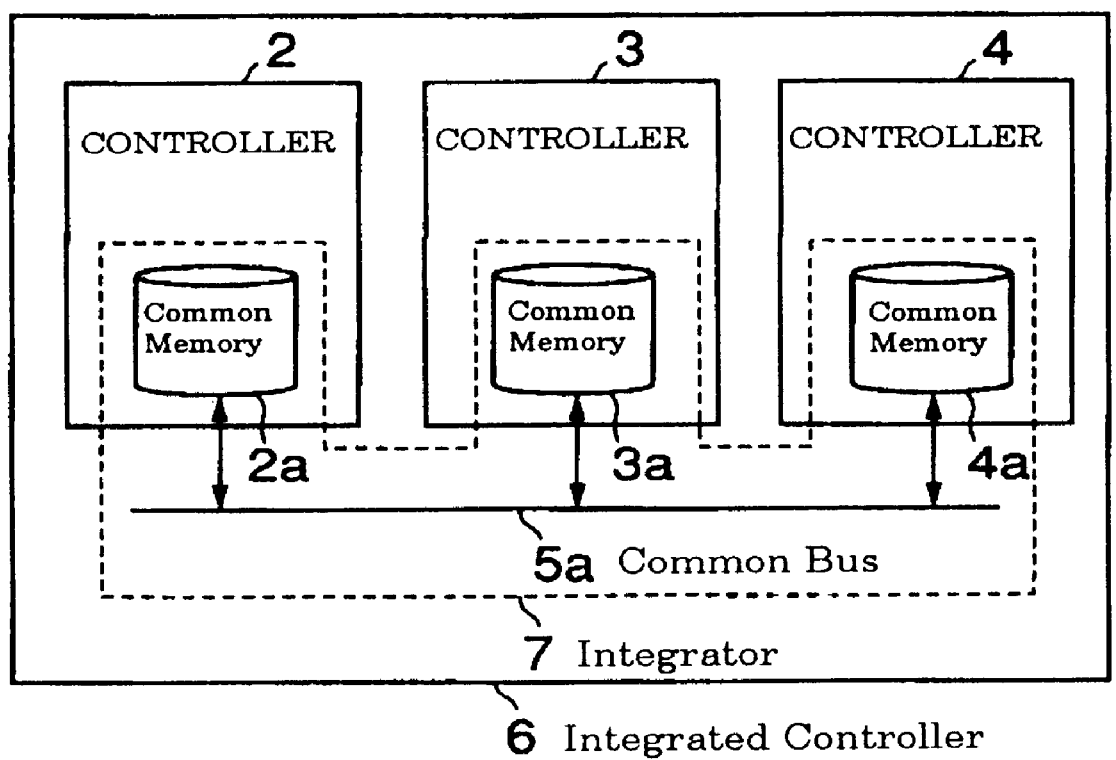
FIG. 3 is a block diagram showing constituents of an integrated controller of a second embodiment.

FIG. 3 is a block diagram showing constituents of a integrated controller 6 of the second embodiment. In FIG. 3, the same numerals as FIGS. 1 and 2 are affixed to the same components as FIGS. 1 and 2, and their explanations are omitted. Only different components are hereinafter described in detail.

An integrator 7 of the integrated controller 6 includes common memories 2a, 3a and 4a, and a common bus 5a.

Each of the controllers 2~4 composing the integrated controller 6 has one of the common memories 2a~4a composing the integrator 7 built-in respectively. Each of the common memories 2a~4a is connected to the common bus 5a individually.

Global variables shared with the controllers 2~4 are stored into the common memories 2a~4a individually. The global variables stored in each common memories 2a~4a are transferred and stored into the other common memories 2a~4a.

In brief, in the second embodiment, global variables to be controlled by the controllers 2~4 are stored in the common memories 2a~4a of the controllers 2~4. The global variables are exchanged among the common memories 2a~4a, thereby enabling the global variables to store into the common memories 2a~4a.

In the second embodiment, an address of the identical global variable is identical among the common memories 2a~4a separately. The address is assigned with an engineering tool(computer) controlling the whole of the integrated controller 6.

Therefore, in each of the common memories 2a~4a, the identical variable is placed in the identical position. Accordingly, each of the controllers 2~4 may access global variables to be controlled by the other controllers 2~4 in the same way as one of the controllers 2~4 accesses variables to be controlled by its own controller 2~4.

As described above, in the integrated controller 6 of the second embodiment, the global variables to be shared with every controller 2~4 are stored into every common memory 2a~4a. The stored global variables in each of the common memories 2a~4a are equalized separately.

Accordingly, each of the controllers 2~4 may use the global variables utilized by the other controllers 2~4 by accessing its own memory 2a, 3a or 4a.

That is, in the second embodiment, each of the controllers 2~4 is connected to each other through the global variables stored in the common memories 2a~4a. Since each of the controllers 2~4 may access the global variables in the same way as one of the controllers 2~4 accesses its internal variables of controller 2, 3 or 4, it is possible to exchange data among the controllers 2~4 and to adjust control cycles of the controllers 2~4.

According to the second embodiment, likewise the integrated controller 6 of the second embodiment may integrates the controllers 2~4 as a single controller imaginarily.

Third Embodiment

In a third embodiment, an integrated control system, which integrates not only internal controllers but also external controllers as a single controller imaginarily, is described.

The integrated system may integrate controllers, which have been already integrated outside, as a single controller imaginarily.

Figure 4:
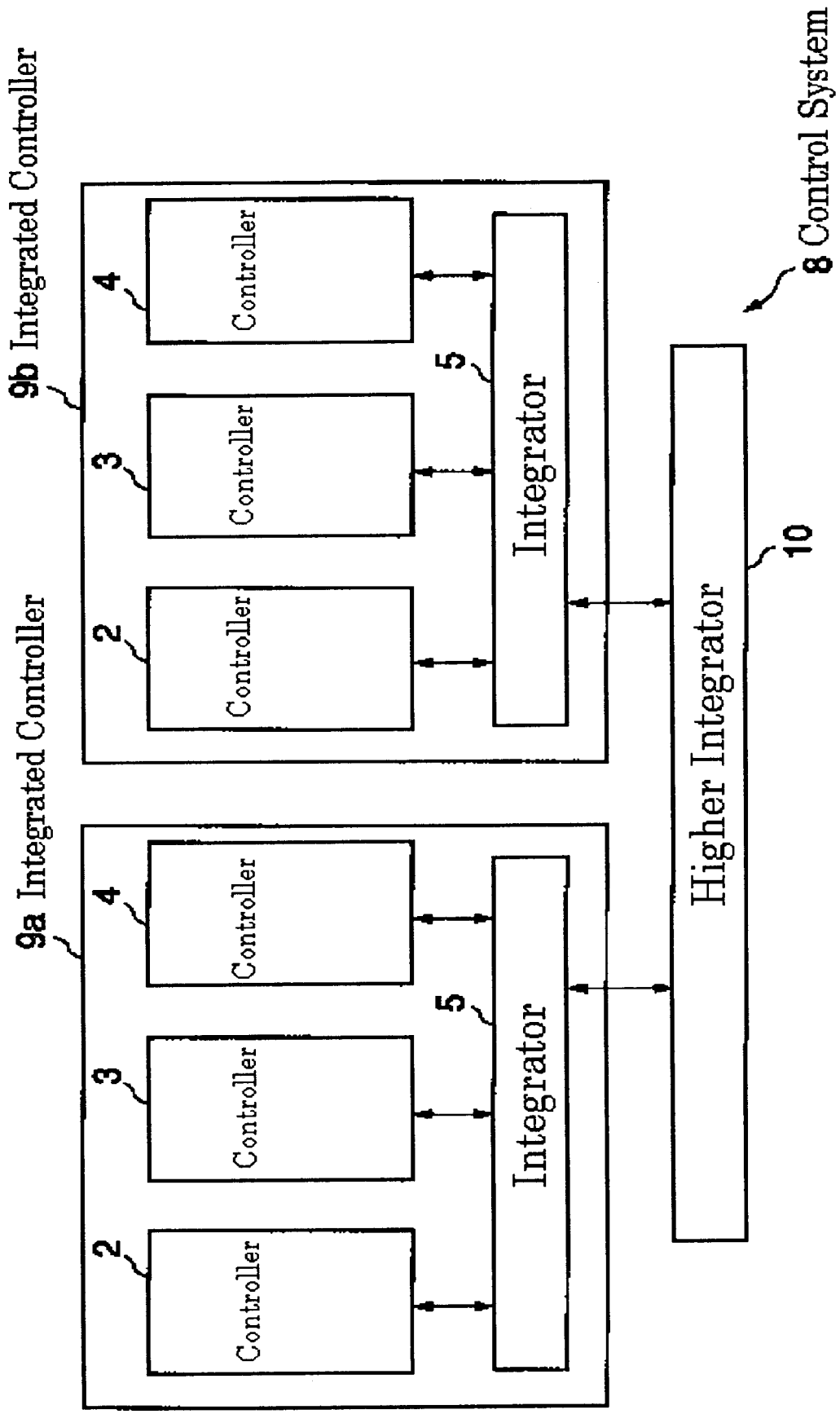
FIG. 4 is a block diagram showing an integrated control system that includes a plurality of integrated controllers.

FIG. 4 is a block diagram showing an integrated control system 8 that includes integrated controllers. In FIG. 4, the same numerals as FIG. 1 are affixed to the same components as FIG. 1, and their explanations are omitted. Only different components are hereinafter described in detail.

The integrated control system 8 includes two integrated controllers 9a and 9b capable of accessing to a higher integrator 10.

Each of the integrated controllers 9a and 9d includes the same components as the integrated controller 1 of the first embodiment and operates in the same way as the first embodiment. Each of the integrators 5 of the integrated controllers 9a and 9b integrates the controllers 2~4 as if it is a single controller.

The higher integrator 10 integrates the integrated controllers 9a and 9b as a single controller again. An actual example of the above described integrated control system 8 that includes the integrated controllers 9a and 9b, and the higher integrator 10 is hereinafter described.

Figure 5:
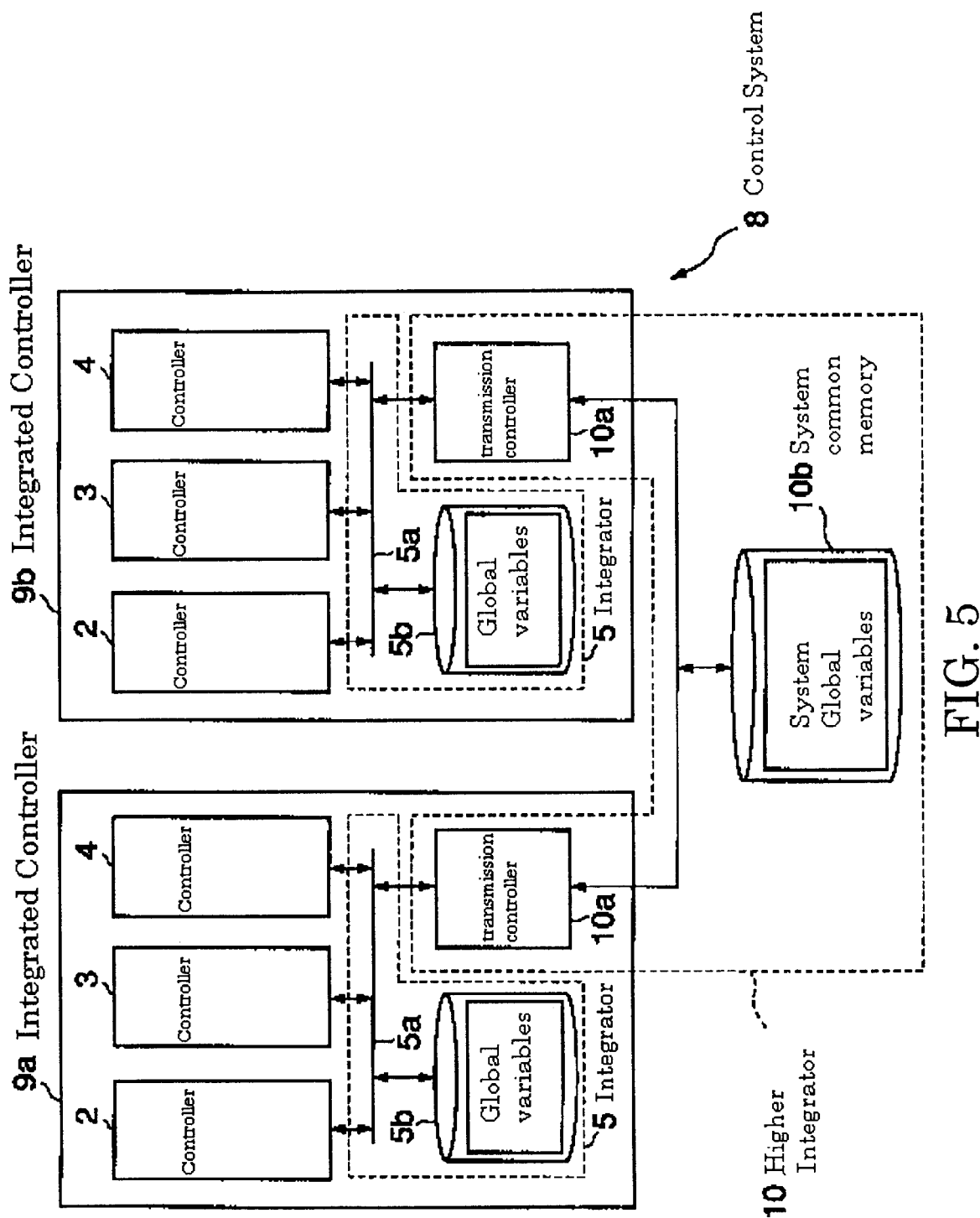
FIG. 5 is a block diagram showing in detail the integrated control system 8 that includes integrated controllers 9a and 9b.

FIG. 5 is a block diagram showing in detail the integrated control system 8 that includes the integrated controllers 9a and 9b.

The integrator 5 that integrates either the integrated controller 9a or 9b includes the common bus 5a and the common memory 5b.

The higher integrator 10 includes two transmission controllers 10a installed into the respective integrated controllers 9a and 9b, and a system common memory 10b.

In addition to the controllers 2~4 and the common memory 5b, the transmission controllers 10a are connected to the common bus 5a. The common bus 5a and the transmission controllers 10a enable each of the controllers 2~4 to access the system common memory 10b.

Global variables shared with the controllers 2~4 are stored into the common memory 5b in each of the integrated controllers 9a and 9b. The global variables stored in the common memory 5b may be accessed by the controllers 2~4 corresponding to the integrated controller 9a or 9b, thereby enabling each of the integrated controllers 9a and 9b integrated.

The transmission controllers 10a enable the controllers 2~4 to access the system common memory 10b.

The system common memory 10b is an element that realizes a globalization of the integrated control system 8. System global variables shared with the integrated controllers 9a and 9b are stored in the system common memory 10b. Both of the controllers 2~4 of the integrated controllers 9a and 9b may access the system common memory lob in common by using the respective transmission controllers 10a.

That is, in the third embodiment, two integrated controllers 9a and 9b are connected to each other through the system global variables stored in the system common memory 10b. Since each of the controllers 2~4 of any integrated controllers 9a and 9b may access the system global variables in the same way as one of the controllers 2~4 accesses its internal variables of controller 2, 3 or 4, it is possible to exchange data among the integrated controllers 9a and 9b and to adjust control cycles by using the system global variables. Accordingly, a combined system of the integrated controllers 9a and 9b may be integrated as if it is a single controller.

As described above, the integrated control system uses two kinds of variables, which are the global variables exchanged among the controllers 2~4 of the integrated controller 9a or 9b, and the system global variables exchanged between the integrated controllers 9a and 9b.

Accordingly, since a plurality of integrated controllers, each of which integrates a plurality of controllers as a single controller, are further treated as a single controller, various controls maybe combined and suitable controls maybe provided. Further, an effective control system for users designing and managing a control may be provided.

In the above embodiment, although the integrated control system 8 integrates both the controllers 2~4 and the integrated controllers 9a and 9d in two levels, a plurality of integrated control systems may be integrated in the same way.

Fourth Embodiment

In a fourth embodiment, a modified integrated control system of the above third embodiment is described.

Figure 6:
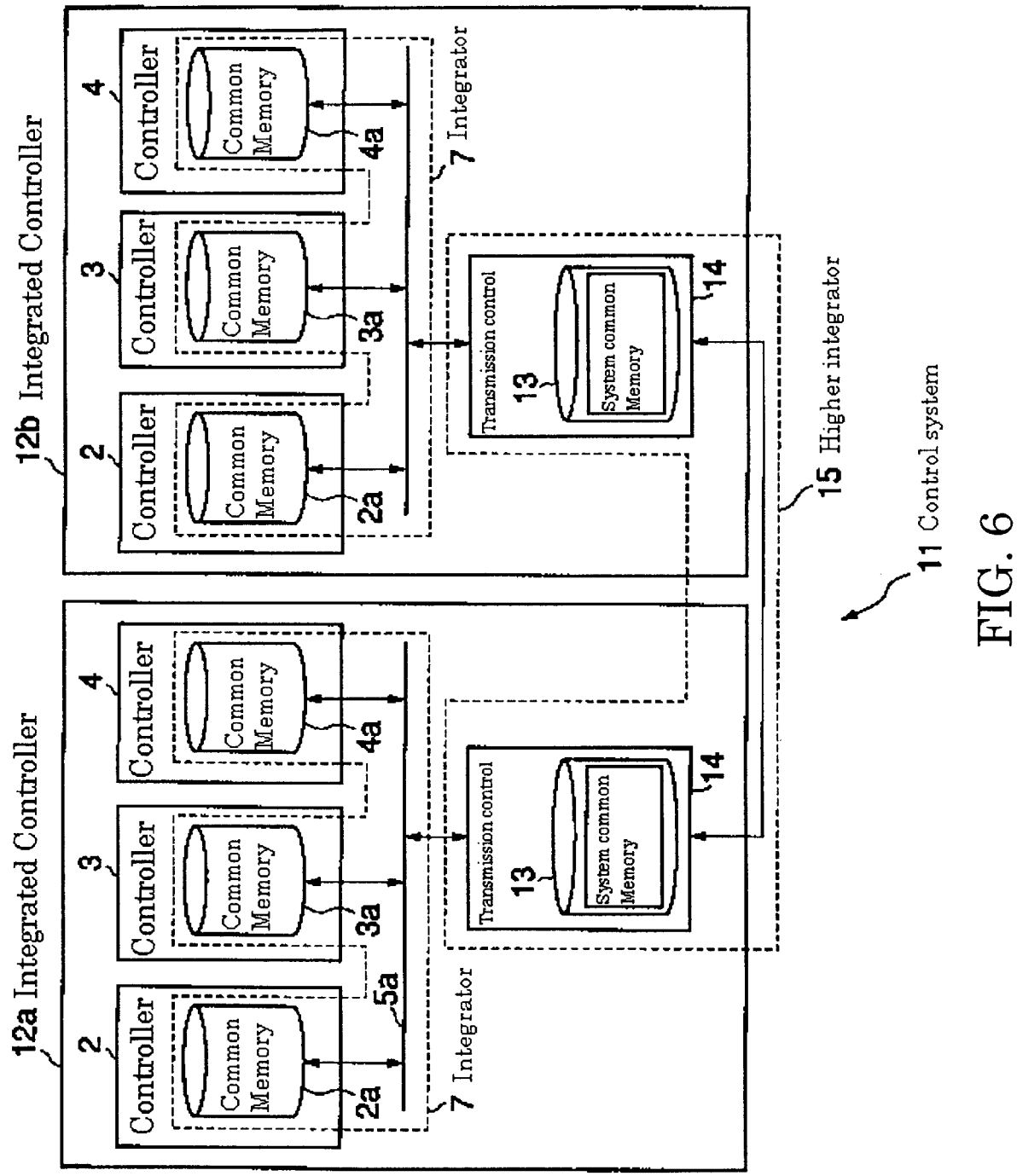
FIG. 6 is a block diagram showing an integrated control system of a fourth embodiment.

FIG. 6 is a block diagram showing an integrated control system 11 of the fourth embodiment. In FIG. 6, the same numerals as FIGS. 3 through 5 are affixed to the same components as FIGS. 3 through 5, and their explanations are omitted. Only different components are hereinafter described in detail.

The integrated control system 11 includes two integrated controllers. Each of the integrated controllers 12a and 12b has the same components as the integrated controller 6 of the second embodiment, and further includes transmission controller 14 having a system common memory 13 built-in.

A higher integrator 15 includes two transmission controllers 14 disposed on the integrated controllers 12a and 12b.

In the fourth embodiment, each of the controllers 2~4 of the integrated controller 12a stores system global variables into the system common memory 13 of the transmission controller 14 disposed on the integrated controller 12a. Likewise, each of the controllers 2~4 of the integrated controller 12b stores system global variables into the system common memory 13 of the transmission controller 14 disposed on the integrated controller 12b.

The system global variables stored in the system common memories 13 are exchanged between the transmission controllers 14 and are equalized at all times.

The system common memories 13 of the transmission controllers 14 may be accessed by any of the controllers 2~4 disposed on the identical integrated controller 12a or 12b.

Accordingly, each of the integrated controllers 12a and 12b may easily use the system global variables at a high speed by accessing its own system common memory 13, even if the system global variables are controlled by the other integrated controller 12a or 12b thereby enabling to exchange data between the integrated controllers 12a and 12b and to adjust a control timing between the integrated controllers 12a and 12b.

As described above, since it is possible to exchange data between the integrated controllers 12a and 12b and to adjust a control timing between the integrated controllers 12a and 12b, a combined control system of the integrated controllers 12a and 12b may be treated as a single controller.

Likewise the third embodiment, according to the fourth embodiment, a suitable control maybe realized and a convenient control system for users may be provided.

Fifth Embodiment

In a fifth embodiment, a format of an instruction code used by the integrated controllers of the above embodiments is described.

Figure 7:
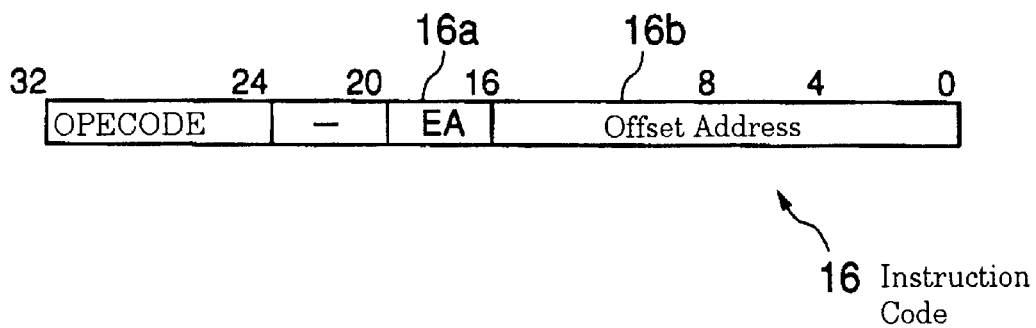
FIG. 7 illustrates a format of an instruction code used by an integrated controller of a fifth embodiment.

FIG. 7 illustrates a format of an instruction code 16 used by an integrated controller of the fifth embodiment.

In the instruction code 16, an address of an operand includes a code 16a indicating a position of a variable in addition to an offset address 16b. The code 16a tells whether the variable is positioned inside of an integrated controller or outside of the integrated controller.

In case of accessing a variable, first obtaining an accessing position on the basis of the code 16a, and then accessing a position indicated by an offset address 16b of the accessing position. Therefore, global variables may be accessed in the same way as local variables used by only local controllers such as the controllers 2~4 of the above embodiments.

Likewise the fourth embodiment, in the fifth embodiment, each of controllers has a transmission controller including a common memory, and the respective data stored in the common memories are always equalized.

Figure 8:
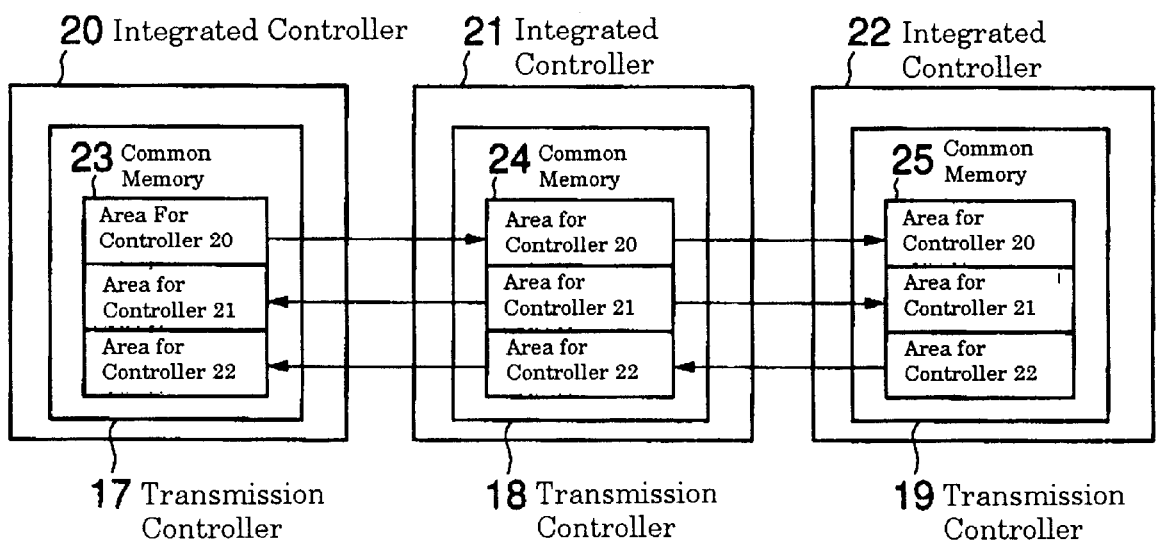
FIG. 8 is a block diagram showing an example of a processing that equalizes information stored in common memories of transmission controllers.

FIG. 8 is a block diagram showing an example of a processing that equalizes information stored in common memories 23, 24 and 25 of transmission controllers 17, 18 and 19.

The transmission controllers 17, 18 and 19 are disposed on integrated controllers 20, 21 and 22 respectively. Each of the common memories 23~25 holds an area for each of the integrated controllers 20~22 transmitting stored data. The stored data in the area is periodically transmitted to the common memories 23~25 of the other transmission controllers 17~19.

As described above, variables to be used by the other integrated controllers 20~22 may be easily utilized by equalizing information stored in the respective common memories 23~25 and harmonizing a format of an instruction code concerning local variables with a format of an instruction code concerning global variables.

Generally speaking, in case of accessing and utilizing variables through transmission controllers, it is necessary to make a data transmission program for accessing variables and to execute the data transmission program.

However, in the fifth embodiment, since the global variables may be accessed by simply accessing the common memories 23~25, it is unnecessary to make a special program in order to integrate the integrated controllers 20~22.

As described above, in the integrated control system of the fifth embodiment, the common memories 23~25 are equalized. Further, the code 16a indicating a position storing data is included into an address designating a global variable to be shared with the integrated controllers 20~22, thereby enabling to access the global variable in the same way as the local variables used by only local controllers such as the controllers 2~4 of the above embodiments.

According to the fifth embodiment, the local variables used by the controllers 2~4 disposed either inside or outside may be expressed in the same format as the global variables, thereby enabling to make a program without being conscious of a position of variables.

In case of not integrated as described above, it is required to execute a function block in order to read a variable from other integrated controllers, and to utilize an output of the function block. As a result, a program executing the function block becomes complicated.

Therefore, in addition to the same effect as described above, a programming procedure may be simplified and a convenient integrated control system for users may be provided.

Sixth Embodiment

In a sixth embodiment, a plurality of different types of controllers are integrated in the same way as the above embodiments and the respective different controllers further execute a common instruction code.

The controllers of an integrated controller may process the instruction code by either hardware or software interpreting the instruction code.

That is, in the integrated controller of the sixth embodiment, the internal controllers may interpret the common instruction code and execute it, even if the controllers are a sequence controller, a loop controller or other controllers.

Further, since the internal controllers of the integrated controller may be treated as a single controller, the controllers may access a common I/O module and have a common circumstance.

Accordingly, the controllers are designed to create an identical executed result, even if a program is executed by any of the controllers, although execution times are different respectively.

Therefore, after a program is designed by a common program editor, a selected controller suitable for the program may execute it. Further, the program may be divided into some portions and the respective portions of the program may be executed by a plurality of controllers. Furthermore, a suitable program may be executed by a suitable controller.

Seventh Embodiment

In a seventh embodiment, an integrated controller such as the integrated controller 6, which has an assembling port connecting a new controller and enabling a position of a controller changed, is hereinafter described.

In the integrated controller of the seventh embodiment, a format of the instruction code 16 shown in FIG. 7 is used and a position of information stored in a common memory may be designated with an identical address by any of controllers of the integrated controller.

Accordingly, an identical executed result may be obtained by executing a program, even if controllers are installed anywhere, as far as the controllers are disposed on the same integrated controller.

In case of installing common memories on the respective controllers, it is required that each of controllers has to check addresses of the other controllers before executing a program. But, after checking the addresses, each of the controllers may communicate by accessing and asking a logical address of the other controllers, indicating a global variable and a physical address indicating which controller has the variable.

As described above, in the seventh embodiment, a method of accessing global variables may not change on the ground of an installing position of a controller.

Therefore, a controller may be freely assembled, because the assembling port that includes a slot and a connector is formed in the integrated controller. Further, a controller may be changed easily, because it is not required to change a program on the ground of an installing position of the controller.

Eighth Embodiment

In an eighth embodiment, an integrated controller executing a program made by an object oriented programming method is described.

In the eighth embodiment, the object oriented programming method is adopted to each of controllers of the integrated controller described in the above embodiments. In the integrated controller of the eighth embodiment, a program executed by each of the controllers and data for its exclusive use make a pair.

In case of utilizing the object oriented programming method, an address of data is generally determined at compiling a program. Once a program is modified, the address of data is replaced. Further, because a data area is reset to a new data area at changing a program, the previous data before changing the program is lost.

One object of the integrated controller of the eighth embodiment is to keep a continuity of a control. Local variables are still maintained after changing a program in order to continuously use the local variables, which is used before changing the program, at a subsequent processing.

Global variables are necessarily maintained in a common memory after changing a program, in case other controller may use the global variables.

To maintain the previous data which is used before changing a program, an engineering tool (computer) compiles not to change offset addresses of the local variables at changing the program while the program is being executed.

Figure 9:
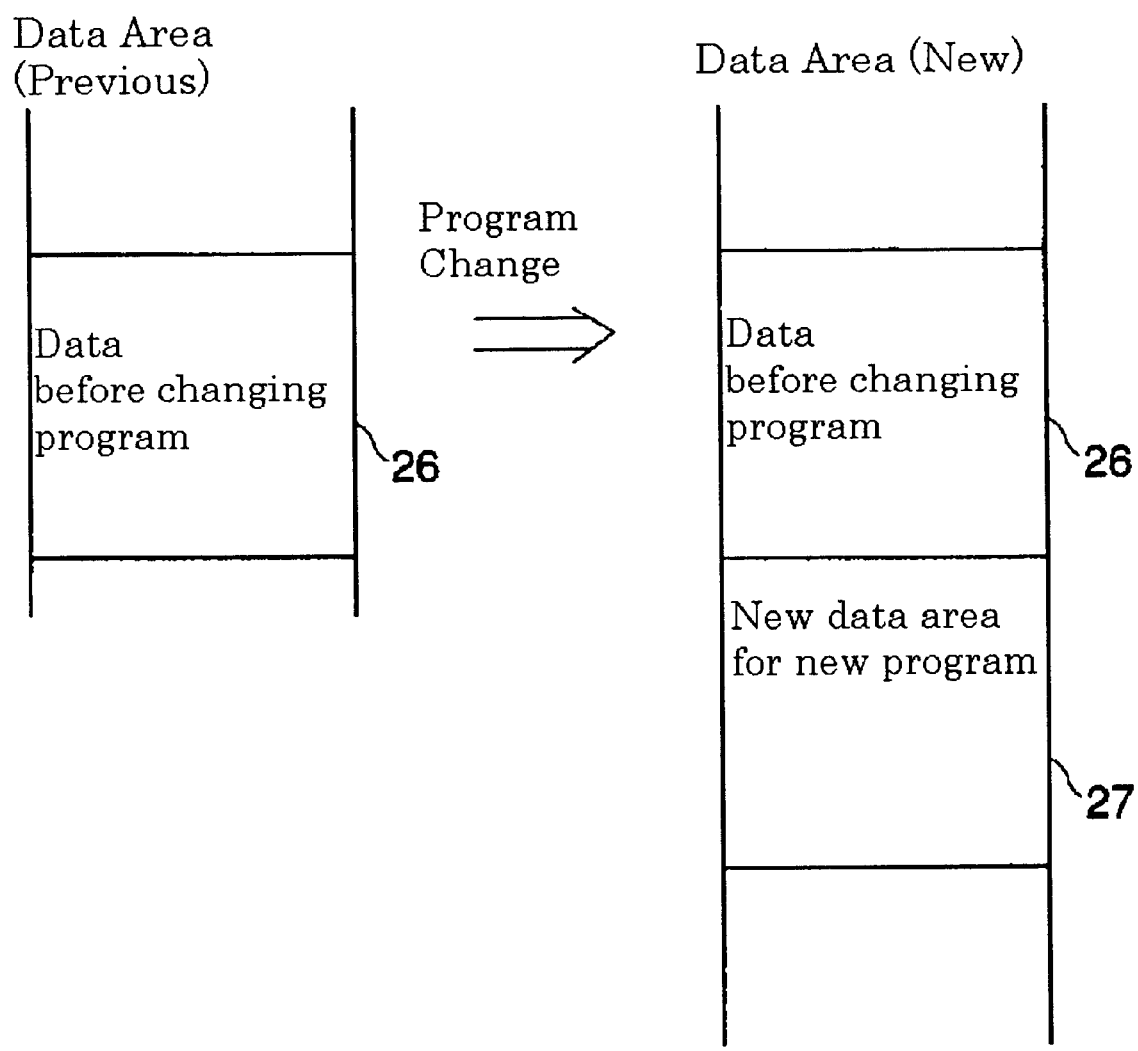
FIG. 9 is an illustrative diagram showing a change of a data area at changing a program of one of controllers.

FIG. 9 is an illustrative diagram showing a change of a data area at changing a program of one of controllers.

In case new variables are added after changing a program, the new variables are stored in an area 27 in a way such that the new variables are added to the previous data stored in an area 26, and new addresses are used. Further, in case of deleting any of the previous data, offset addresses of the previous data are not used for new variables and left as it is. A programming support tool transmits the size of a data area to be newly added and the volume of data to be copied from the previous data area to a controller at downloading a new program to the controller.

As described above, the previous data (variables) and their addresses are not changed, even if a formation of the variables is changed and a layout of data area is changed because of changing a program.

Accordingly, even if the controllers adopt the object oriented programming method, a program may be changed while executing the program.

Ninth Embodiment

In a ninth embodiment, an integrated control system having transmission controllers that integrate controllers and further integrate integrated controllers is hereinafter described.

Figure 10:
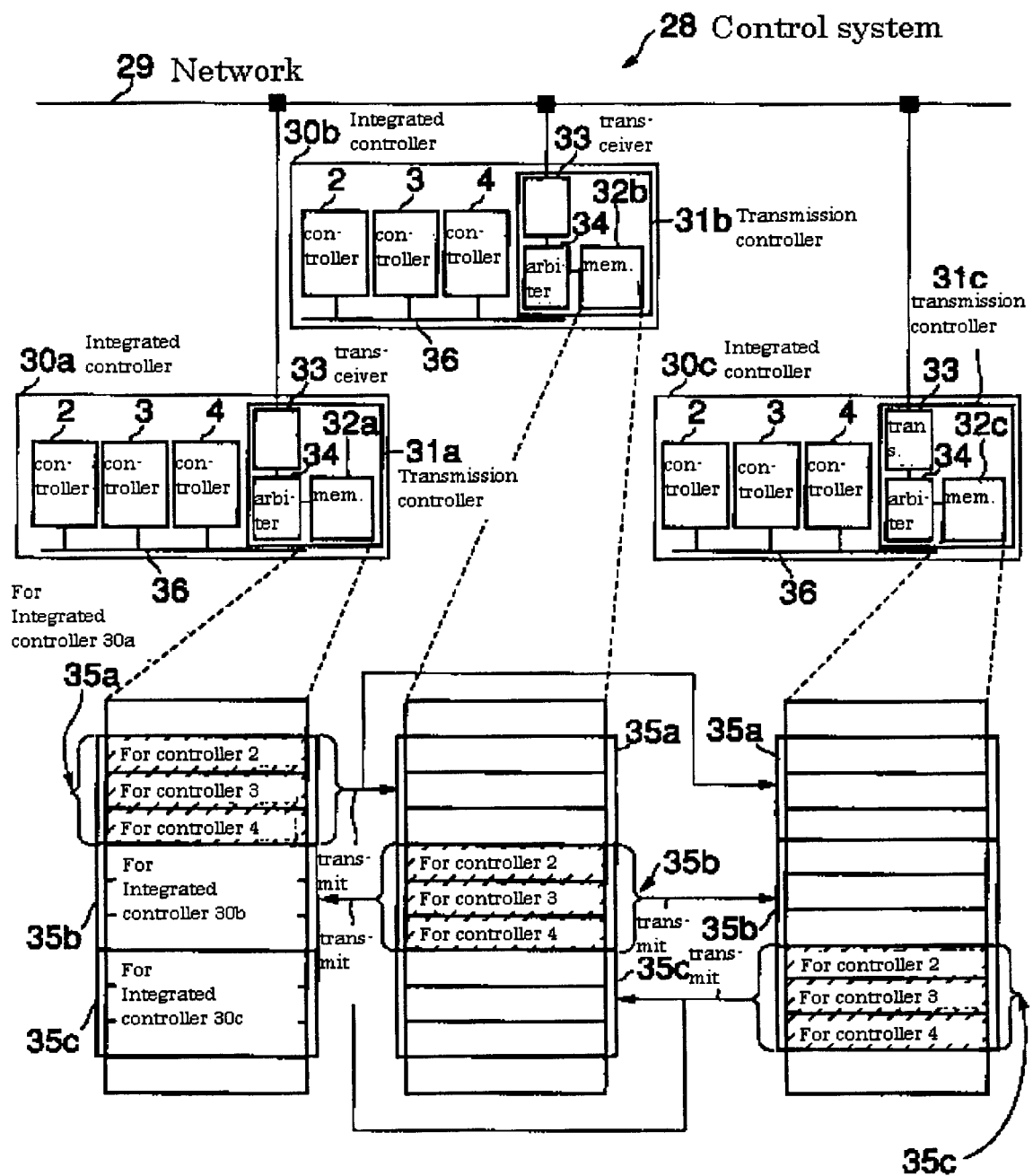
FIG. 10 is a block diagram showing an integrated control system of a ninth embodiment.

FIG. 10 is a block diagram showing an integrated control system 28 of the ninth embodiment.

Figure 11:
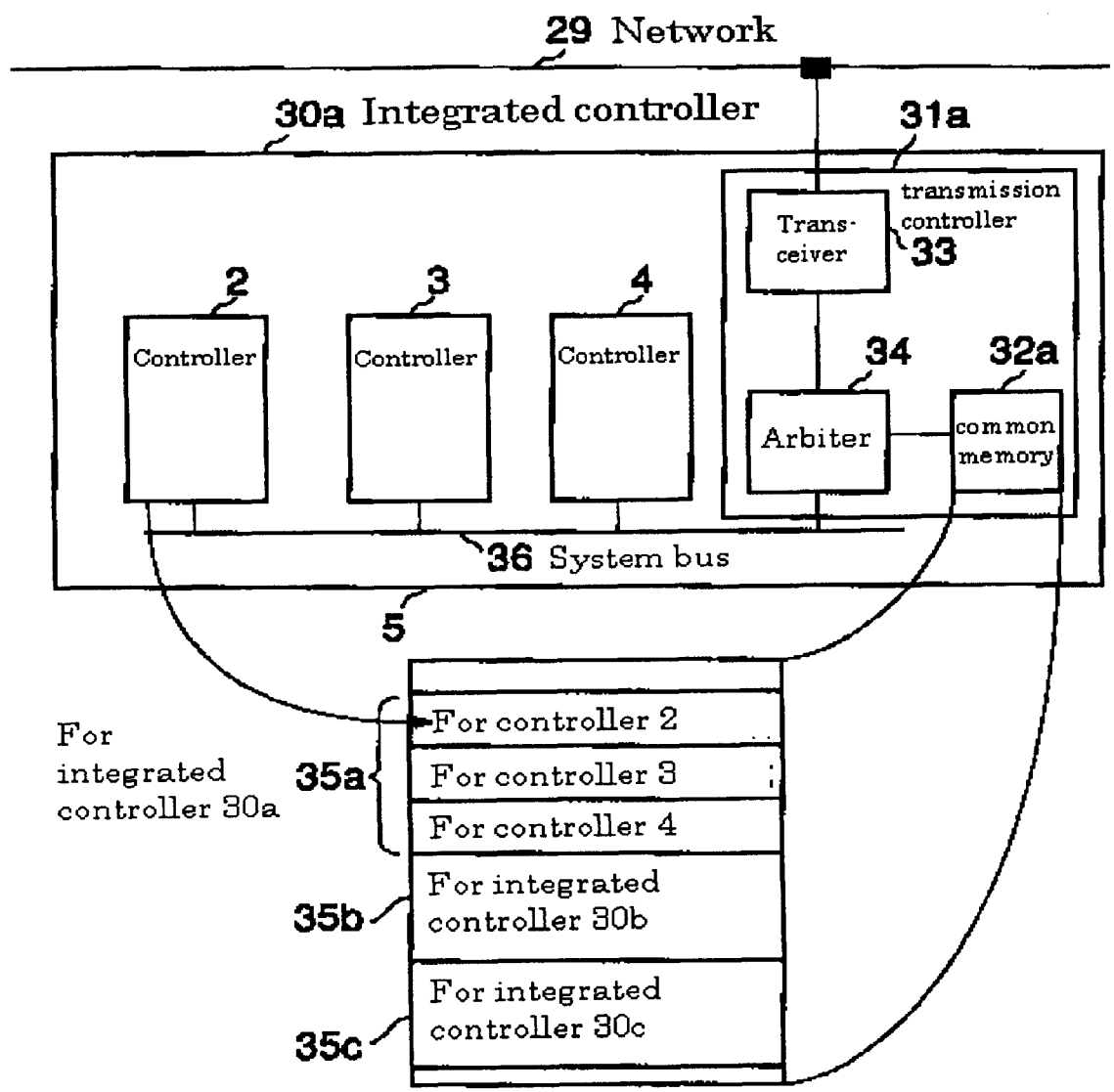
FIG. 11 is a block diagram showing one of integrated controllers 30a, 30b and 30c.

FIG. 11 is a block diagram showing one of the integrated controllers 30a, 30b and 30c.

In FIGS. 10 and 11, the same numerals as FIG. 1 are affixed to the same components as FIG. 1, and their explanations are omitted. Only different components are hereinafter described in detail.

The integrated control system 28 includes three integrated controllers 30a, 30b and 30c connected to a network 29 respectively.

The integrated controllers 30a~30c include transmission controllers 31a, 31b and 31c that function as integrators respectively in addition to the controllers 2~4. The transmission controllers 31a, 31b and 31c are respectively connected to system buses 36.

The transmission controllers 31a~31c of the integrated controllers 30a~30c include common memories 32a, 32b and 32c respectively. Each of the transmission controllers 31a~31c includes a transceiver 33 communicating with the other transmission controllers and an arbiter 34 equalizing data among the common memories 32a~32c.

The common memory 32a is composed of an area 35a storing data written by the integrated controller 30a, an area 35b storing data transmitted from the integrated controller 30b and an area 35c storing data transmitted from the integrated controller 30c.

Each of the areas 35a, 35b and 35c is further divided into three areas for the respective controllers 2, 3 and 4.

Each of the common memories 32b and 32c is divided in the same way as the common memory 32a as shown in FIG. 11 and has the same formation as the common memory 32a.

Each of the integrated controllers 30a~30c periodically transmits data stored in an area assigned by its own integrated controller 30a, 30b or 30c to the other integrated controllers 30a~30c.

In brief, the integrated controller 30a periodically transmits data stored in the area 35a of the common memory 32a to the integrated controllers 30b and 30c. The integrated controller 30b writes the transmitted data from the integrated controller 30a into an area corresponding to the area 35a of the common memory 32b. Likewise, the integrated controller 30c writes the transmitted data from the integrated controller 30a into an area corresponding to the area 35a of the common memory 32c. As to each of the other area 35b and 35c, each of the integrated controllers 30a~30c operates in the same way.

An operation of the common memory 32a of the integrated controller 30a is hereinafter described as an example.

As shown in FIG. 11, the area 35a of the common memory 32a is an assigned area used for the controllers 2~4 of the integrated controller 30a.

Each of the controllers 2~4 writes data to its assigned area of the area 35a through the system bus 36.

Each of the controllers 2~4 may access the area 35a assigned for its own integrated controller 30a and the other areas 35b and 35c assigned for the other integrated controllers 30b and 30c and read data stored in the areas 35a~35c.

The controller 2 writes variables used for a program to an area, assigned for the controller 2, of the area 35a. The variables are periodically renewed by the controller 2.

Data stored in the area 35a of the common memory 32a are stored in the areas 35a of the common memories 32b and 32c of the integrated controllers 30b and 30c.

The controllers 2~4 of the other integrated controllers 30b and 30c may read variables stored in an area, assigned for the controller 2, of the area 35a of the integrated controller 30a.

Accordingly, the stored variables may be shared among the controllers 2~4 of the integrated controllers 30a~30c, thereby realizing global variables within both the controllers 2~4 and the integrated controllers 30a~30c.

According to the transmission controllers 31a~31c of the ninth embodiment, a plurality of controllers 2~4 may be treated as a single controller and further a plurality of integrated controllers 30a~30c may be treated as a single controller.

Therefore, controlling items required by users are executed by suitable controllers by adopting a loop controller, a sequence controller, a computer controller or the like as the need arises.

Tenth Embodiment

In a tenth embodiment, an integrated control system, having transmission controllers that integrate integrated controllers connected to different kinds of networks each other without utilizing a gateway device, is described.

Figure 12:
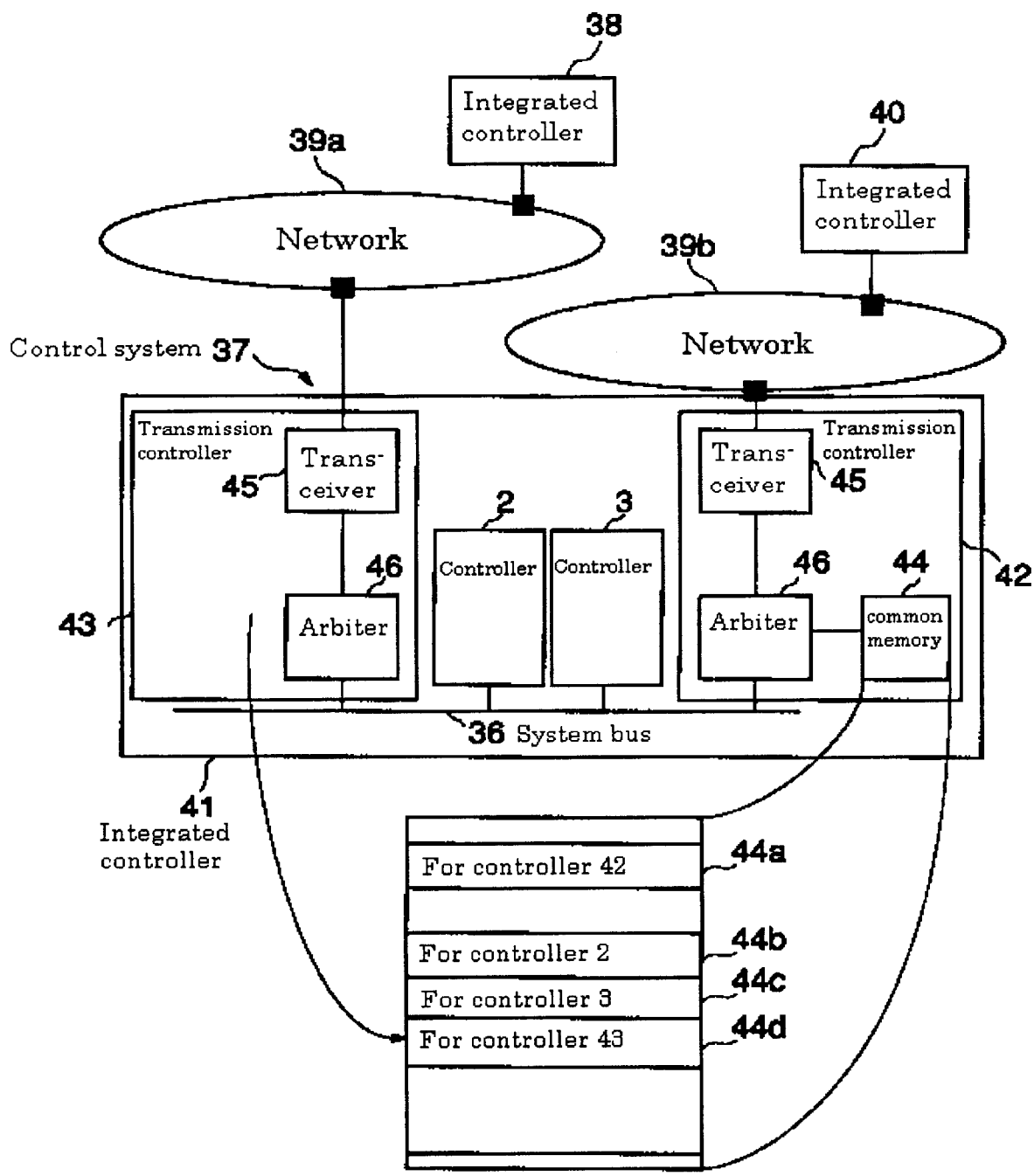
FIG. 12 is a block diagram showing an integrated control system of a tenth embodiment.

FIG. 12 is a block diagram showing an integrated control system 37 of the tenth embodiment. In FIG. 12, the same numerals as FIG. 10 are affixed to the same components as FIG. 10, and their explanations are omitted. Only different components are hereinafter described in detail.

The integrated control system 37 includes an integrated controller 41 connected to both a network 39a connecting an integrated controller 38 and a network 39b connecting an integrated controller 40.

In the integrated control system 37, for example, the network 39a is the Ethernet and the network 39b is the Field Bus. That is, a system of the network 39a is different from a system of the network 39b.

The integrated controller 41 includes a first transmission controller 42 and a second transmission controller 43 in addition to the controllers 2 and 3.

The first transmission controller 42 is connected to the network 39b and the second transmission controller 43 is connected to the network 39a. The both first and second transmission controllers 42 and 43 are installed on the integrated controller 41.

Each of the first and second transmission controllers 42 and 43 includes a transceiver 45 communicating to the network 39a or 39b, and an arbiter 46 sharing data with the integrated controllers 38, 40 and 41.

The second transmission controller 42 includes a common memory 44. The common memory 44 is composed of an area 44a storing data obtained by the transmission controller 42, an area 44b storing data transmitted from the controller 2, an area 44c storing data transmitted from the controller 3 and an area 44d storing data obtained by the transmission controller In case the integrated controller 40 connected to the network 39b transmits data to the integrated controller 38 connected to the network 39a, first the integrated controller 40 writes data to the area 44a of the common memory 44 of the integrated controller 41.

The transmission controller 43 reads data stored in the area 44a of the common memory 44 and transmits the data to the integrated controller 38 connected to the network 39a.

Likewise, in case the integrated controller 38 connected to the network 39a transmits data to the integrated controller 40 connected to the network 39b, first the integrated controller 41 receives data through the transmission controller 43 and writes the data to the area 44d of the common memory 44.

The transmission controller 42 reads data stored in the area 44d of the common memory 44 and transmits the data to the integrated controller 40 connected to the network 39b.

As described above, according to the transmission controllers 42 and 43 of the integrated controller 41, since data can be transmitted between the different kinds of networks 39a and 39b through the common memory 44, a data transmission between the integrated controllers 38 and 40 may be realized without using a special controller or a gateway device.

Therefore, the integrated controllers 38, 40 and 41 may be integrated as a single controller. Further, a data transmission between the different systems of networks may be realized at a high speed and a control cycle may be adjusted suitably.

According to the present invention, different methods of controls, for example, a loop control, a sequence control and a computer control may be integrated as a single controller imaginarily.

Therefore, a control that is programmed a feature of each control is realized, thereby controlling a control target suitably.

Further, since the present invention integrates a plurality of controllers into a single controller imaginarily unlike in case the controllers simply cooperate with each other, a data communication is suitably executed and a suitable control cycle is realized.

Furthermore, in case of controlling a combined different control methods, since a design and a management of controlling items are handled together, it becomes convenient for users.

Various modifications and variations are possible in light of the above teachings. Therefore, it is to be understood that within the scope of the appended claims, the present invention may be practiced otherwise than as specifically described herein.

What is claimed is:

1. An integrated controller, comprising:
    a plurality of controllers, each of said controllers executing a different program; and
    an integrator configured to imaginarily integrate said controllers as a single controller.

2. The integrated controller as recited in claim 1, wherein one of said controllers realizes at least one of a loop control, a sequence control and a computer control.

3. The integrated controller as recited in claim 1, wherein said integrator comprises a common memory that stores global variables accessed and shared with said controllers.

4. The integrated controller as recited in claim 3, wherein said controllers use a command format capable of accessing variables other than said global variables in the same way as accessing said global variables.

5. The integrated controller as recited in any one of claims 1–3, wherein any of said controllers are capable of interpreting and executing a common program.

6. The integrated controller as recited in any one of claims 1–3, further comprising:
    an assembling port configured to assemble one of said controllers.

7. The integrated controller as recited in claim 3, wherein the previous variable stored in said common memory is preserved and a new variable is added to said common memory, when said program is changed.

8. An integrated control system, comprising:
    a plurality of integrated controllers, each of said integrated controllers comprising a plurality of controllers, each of said controllers executing a different program, and a first integrator configured to imaginarily integrate said controllers as a single controller; and
    a second integrator configured to imaginarily integrate said integrated controllers as a single controller.

9. The control system as recited in claim 8, wherein one of said controllers realizes at least one of a loop control, a sequence control and a computer control.

10. The control system as recited in claim 8, wherein said first integrator comprises a common memory that stores global variables accessed and shared with said controllers.

11. The control system as recited in any one of claims 8–10, wherein any of said controllers are capable of interpreting and executing a common program.

12. The control system as recited in any one of claims 8–10, further comprising:
    an assembling port configured to assemble one of said controllers.

13. The control system as recited in claim 10, wherein said controllers use a command format capable of accessing variables other than said global variables in the same way as accessing said global variables.

14. The control system as recited in claim 8, wherein said first integrator comprises a plurality of common memories, one of said common memories being assigned to one of said controllers, and an arbiter configured to equalize variables stored in said common memories.

15. A transmission controller for data communication, comprising:
    a first common memory storing global variables accessed and shared with a plurality of first controllers executing different programs respectively, said global variables being stored in each area assigned for each of said first controllers; and
    an arbiter configured to equalize said global variables stored in said first common memory with variables stored in a second common memory connected outside.

16. The transmission controller as recited in claim 15, wherein one of said first controllers realizes at least one of a loop control, a sequence control and a computer control.

17. The transmission controller as recited in claims 15 or 16, wherein said global variables are accessed and shared with a second controller connected to a different system of network and stored in an area assigned for said second controller, and said arbiter communicates said global variables over said different system of network.

* * * * *